United States Patent
Hanazono et al.

(10) Patent No.: US 11,083,069 B2
(45) Date of Patent: Aug. 3, 2021

(54) LIGHTING CONTROL SYSTEM, LIGHTING CONTROL METHOD, AND PROGRAM

(71) Applicant: Panasonic Intellectual Property Management Co., Ltd., Osaka (JP)

(72) Inventors: Masaya Hanazono, Osaka (JP); Katsuhiko Kimura, Osaka (JP); Ryuji Natsume, Osaka (JP); Minoru Fukushima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/644,370

(22) PCT Filed: Aug. 20, 2018

(86) PCT No.: PCT/JP2018/030612
§ 371 (c)(1),
(2) Date: Mar. 4, 2020

(87) PCT Pub. No.: WO2019/049640
PCT Pub. Date: Mar. 14, 2019

(65) Prior Publication Data
US 2020/0205269 A1 Jun. 25, 2020

(30) Foreign Application Priority Data
Sep. 7, 2017 (JP) .............................. JP2017-172470

(51) Int. Cl.
*H05B 47/12* (2020.01)
*G06F 3/16* (2006.01)
*G10L 15/02* (2006.01)

(52) U.S. Cl.
CPC .............. *H05B 47/12* (2020.01); *G06F 3/167* (2013.01); *G10L 15/02* (2013.01)

(58) Field of Classification Search
CPC .......... H05B 47/12; G06F 3/167; G10L 15/02
See application file for complete search history.

(56) References Cited

U.S. PATENT DOCUMENTS

2014/0354160 A1* 12/2014 Aggarwal .............. H05B 47/12
315/152

FOREIGN PATENT DOCUMENTS

| CN | 106653014 A | 5/2017 |
| JP | 2002-289371 A | 10/2002 |

(Continued)

OTHER PUBLICATIONS

International Search Report for corresponding Application No. PCT/JP2018/030612, dated Oct. 16, 2018.
(Continued)

*Primary Examiner* — Seokjin Kim
(74) *Attorney, Agent, or Firm* — Renner, Otto, Boisselle & Sklar, LLP

(57) ABSTRACT

A microphone picks up a speech and outputs a speech signal. A lighting control unit recognizes the speech by performing speech recognition on the speech signal, thereby generating command data corresponding to the speech recognized. The lighting control unit controls a light fixture based on the command data. A state decision unit makes a state decision of the light fixture. A condition setting unit sets, depending on the state decision made by the state decision unit, a condition for a speech recognition unit to perform the speech recognition.

17 Claims, 4 Drawing Sheets

(56) References Cited

FOREIGN PATENT DOCUMENTS

JP      2006-286275 A      10/2006
JP      2017-046295 A      3/2017

OTHER PUBLICATIONS

Written Opinion for corresponding Application No. PCT/JP2018/030612, dated Oct. 16, 2018.
Chinese Office Action corresponding application No. 201880057757.0 dated Apr. 15, 2021, with its English translation.

* cited by examiner

LIGHTING CONTROL SYSTEM, LIGHTING CONTROL METHOD, AND PROGRAM

TECHNICAL FIELD

The present disclosure generally relates to a lighting control system, a lighting control method, and a program.

BACKGROUND ART

Controllers for remote-controlling light fixtures using speech recognition have been known in the art.

For example, according to Patent Literature 1, each light fixture is provided with a speech control means including a microphone and a speech recognition unit. The speech recognition unit is configured to register an identification speech to identify the light fixture and a verbal command instructing the state that the light fixture should assume (e.g., that the light fixture should be turned ON, OFF, UP, or DOWN). When the verbal command instructing that the light fixture should be turned ON, OFF, UP, or DOWN and uttered with the identification speech is recognized by the speech recognition unit through the microphone of the speech control means, the state of the light fixture identified by the identification speech may be controlled on an individual basis.

However, the controller of Patent Literature 1 could recognize the speech erroneously to control the light fixture to a wrong state.

CITATION LIST

Patent Literature

Patent Literature 1: JP 2006-286275 A

SUMMARY OF INVENTION

It is therefore an object of the present disclosure to provide a lighting control system, lighting control method, and program, all of which are configured or designed to improve the accuracy of controlling a light fixture using speech recognition by reducing speech recognition errors.

A lighting control system according to an aspect of the present disclosure includes a speech recognition unit, a lighting control unit, a state decision unit, and a condition setting unit. The speech recognition unit carries out speech processing. The speech processing includes: performing speech recognition on a speech signal; and generating speech recognition information corresponding to a speech recognized. The lighting control unit controls a light fixture in accordance with the speech recognition information. The state decision unit makes a state decision of the light fixture. The condition setting unit sets, depending on the state decision made by the state decision unit, a condition for the speech recognition unit to carry out the speech processing.

A lighting control system according to another aspect of the present disclosure is designed to receive speech recognition information corresponding to a speech recognized by a speech recognition unit. The speech recognition unit performs speech recognition on a speech signal. The lighting control system includes a lighting control unit, a state decision unit, and a communications unit. The lighting control unit controls a light fixture in accordance with the speech recognition information. The state decision unit makes a state decision of the light fixture. The communications unit outputs the speech signal and the state decision made by the state decision unit to the speech recognition unit and receives the speech recognition information from the speech recognition unit.

A lighting control method according to still another aspect of the present disclosure includes:

a speech recognition step of carrying out speech processing, the speech processing including: recognizing a speech by performing speech recognition on a speech signal; and generating speech recognition information corresponding to the speech recognized;

a lighting control step of controlling a light fixture in accordance with the speech recognition information;

a state decision step of making a state decision of the light fixture; and a condition setting step of setting, depending on the state decision made in the state decision step, a condition for carrying out the speech processing in the speech recognition step.

A program according to yet another aspect of the present disclosure is designed to make a computer system execute the lighting control method described above.

DESCRIPTION OF EMBODIMENTS

An exemplary embodiment relates to an illumination control system, an illumination control method, and a program (computer program). More particularly, this embodiment relates to a lighting control system, lighting control method, and program for controlling a light fixture using speech recognition.

The lighting control system to be described below is designed to control the state (which may be at least one of an ON state, an OFF state, a light intensity control level, or a color tone) of a light fixture responsive to the user's speech. This lighting control system may be installed in, for example, a single-family dwelling house, each dwelling unit of a multi-family dwelling house, a store, an office, a factory, or a business facility.

Figure 1:
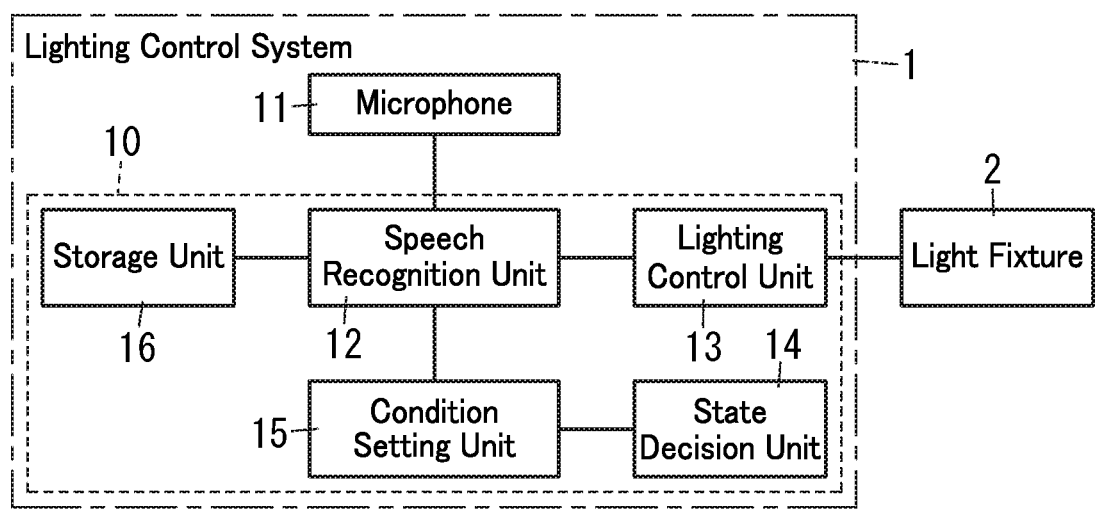
FIG. 1 is a block diagram illustrating a configuration for a lighting control system according to an exemplary embodiment.

FIG. 1 illustrates an exemplary configuration for the lighting control system 1. The lighting control system 1 includes a signal processing unit 10 and a microphone 11 (speech input unit), and controls the state of the light fixture 2.

The light fixture 2 includes, as a light source, a plurality of light-emitting diodes (LEDs), which include multiple groups of LEDs that emit light beams in multiple different colors. That is to say, the light fixture 2 includes a light source that may have its light intensity control level and color tone controlled. Note that the lighting control system 1 does not have to include such a light fixture 2 that may have both its light intensity control level and color tone controlled. Alternatively, the lighting control system 1 may include a light fixture 2 that may have either its light intensity control level or color tone controlled. Still alternatively, the lighting control system 1 may include a light fixture 2 that may be only turned ON and OFF.

To control the state of the light fixture 2, the user gives a verbal command in the form of a word, syllable, or sentence indicating his or her intended type of control. The lighting control system 1 recognizes, as a speech, the verbal command given by the user, and controls the state of the light fixture 2 toward the type of control indicated by the verbal command recognized, thereby performing lighting control.

In this lighting control system 1, the verbal commands that may be used are determined in advance. Examples of the verbal commands include [(Turn) ON], [(Turn) OFF], [Turn UP], [Turn DOWN], [Incandescent], and [Neutral]. The user may give the verbal command [(Turn) ON] to turn ON the light fixture 2 that has been in (totally) OFF state. The user may give the verbal command [(Turn) OFF] to turn OFF the light fixture 2 that has been in (totally or partially) ON state. The user may give the verbal command [Turn UP] to increase the optical output power of the light fixture 2 in ON state. The user may give the verbal command [Turn DOWN] to decrease the optical output power of the light fixture 2 in ON state. The user may give the verbal command [Incandescent] to change the color tone of the light fixture 2 in ON state into an incandescent color. The user may give the verbal command [Neutral] to change the color tone of the light fixture 2 in ON state into a neutral color. Note that these are only exemplary verbal commands and any other verbal command may be adopted as well.

The microphone 11 picks up the user's speech, transforms the speech into an electrical signal, and outputs the electrical signal as a speech signal to the signal processing unit 10. The microphone 11 according to this embodiment includes an analog-to-digital converter (ADC), which converts an analog speech signal into a digital speech signal and outputs the digital speech signal.

The signal processing unit 10 includes a speech recognition unit 12, a lighting control unit 13, a state decision unit 14, a condition setting unit 15, and a storage unit 16.

The lighting control system 1 (signal processing unit 10) according to this embodiment or the agent that carries out the lighting control method according to this embodiment includes a computer system. In that case, the computer system may include, as principal hardware components, a processor and a memory. The functions of the lighting control system 1 (signal processing unit 10) according to this embodiment and the agent that carries out the lighting control method according to this embodiment may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Those electronic circuits may be either integrated together on a single chip or distributed on multiple chips, whichever is appropriate. Those multiple chips may be integrated together in a single device or distributed in multiple devices without limitation.

The speech recognition unit 12 recognizes the speech based on the speech signal, thereby generating speech recognition information corresponding to the speech recognized. That is to say, the speech processing includes speech recognition processing of recognizing the speech based on the speech signal and information generation processing of generating speech recognition information based on the speech recognized.

Specifically, the storage unit 16 stores, in advance, respective speech models corresponding to a plurality of verbal commands. The speech recognition unit 12 compares the speech signal with the speech models stored in the storage unit 16, and may find a speech model that either agrees with, or resembles, the speech signal. In that case, the speech recognition unit 12 is able to determine the language (which may be a word, a syllable, or a sentence) represented by the speech picked up. That is to say, the speech recognition unit 12 is able to recognize the verbal command given by the user.

When successfully recognizing the verbal command given by the user, the speech recognition unit 12 generates speech recognition information corresponding to the verbal command recognized. In this embodiment, the speech recognition information is command data associated in advance with the verbal command recognized. That is to say, each of multiple items of command data is associated in advance one-to-one with any of the plurality of verbal commands. The storage unit 16 stores, in advance, the correspondence between the multiple items of command data and the plurality of verbal commands. Thus, the speech recognition unit 12 is able to generate the command data corresponding to the verbal command recognized by reference to the correspondence.

For example, the command data corresponding to the verbal command [(Turn) ON] is an ON command. The command data corresponding to the verbal command [(Turn) OFF] is an OFF command. The command data corresponding to the verbal command [Turn UP] is a first light intensity control command. The command data corresponding to the verbal command [Turn DOWN] is a second light intensity control command. The command data corresponding to the verbal command [Incandescent] is a first color control command. The command data corresponding to the verbal command [Neutral] is a second color control command. Note that these are only exemplary items of command data, and any other items of command data may also be used.

The lighting control unit 13 controls the state of the light fixture 2 in accordance with the command data generated by the speech recognition unit 12. The lighting control unit 13 may communicate with the light fixture 2 either wirelessly or via a cable to transmit a control signal for controlling the state of the light fixture 2 to the light fixture 2.

For example, when the command data is an ON command, the lighting control unit 13 performs turn ON control of increasing the optical output power of the light fixture 2 to turn the light fixture 2 from OFF to ON. On the other hand, when the command data is an OFF command, the lighting control unit 13 performs turn OFF control of decreasing the optical output power of the light fixture 2 to turn the light fixture 2 from ON to OFF. Furthermore, when the command data is a first light intensity control command, the lighting control unit 13 performs light intensity control of increasing the optical output power of the light fixture 2 to a predetermined degree. Furthermore, when the command data is a second light intensity control command, the lighting control unit 13 performs light intensity control of decreasing the optical output power of the light fixture 2 to a predetermined degree. Furthermore, when the command data is a first color control command, the lighting control unit 13 performs color control of changing the color of the light emitted from the light fixture 2 into an incandescent color. Furthermore, when the command data is a second color control command, the lighting control unit 13 performs color control of changing the color of the light emitted from the light fixture 2 into a neutral color.

In addition, to improve the accuracy of controlling the light fixture 2 using speech recognition by reducing the chances of the speech recognition unit 12 causing speech recognition errors, the signal processing unit 10 includes the state decision unit 14 and the condition setting unit 15.

The state decision unit 14 makes a state decision of the light fixture 2 depending on how power is supplied to the light fixture 2.

Figure 2:
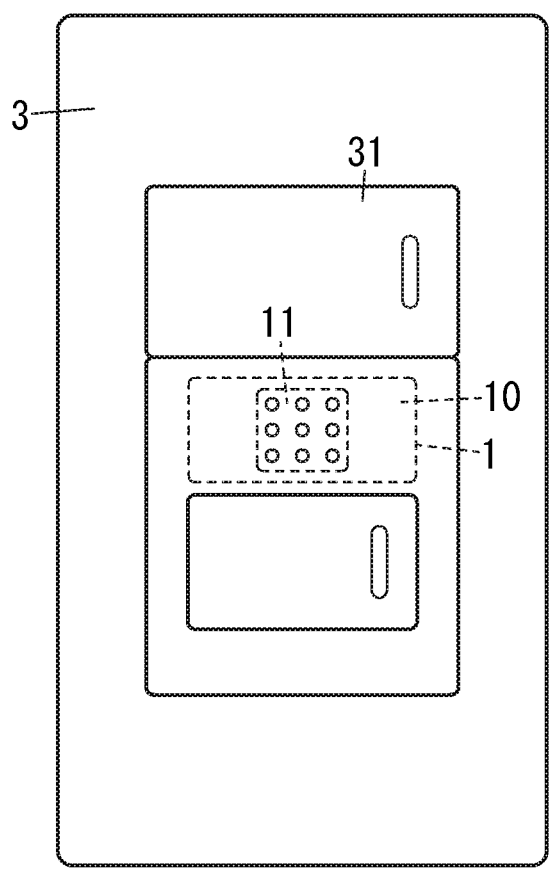
FIG. 2 is a front view illustrating a speech switch including the lighting control system.

In this case, the lighting control system 1 according to this embodiment is built in a lighting switch 3 for turning the light fixture 2 ON and OFF as shown in FIG. 2. The lighting switch 3 includes an operating member 31 on the surface of its body 30. The user's turning the operating member 31 allows the light fixture 2 to be turned ON and OFF. Then, the lighting switch 3 outputs an operating signal, indicating the type of operation done on the operating member 31, to the signal processing unit 10. The operating signal indicates whether the operation done on the operating member 31 is a turn ON operation or a turn OFF operation.

The state decision unit 14 is able to detect, based on the operating signal, that either the turn ON operation or the turn OFF operation has been performed on the operating member 31. Thus, when finding that the turn ON operation has been performed on the operating member 31, the state decision unit 14 determines that power be supplied to the light fixture 2 to keep the light fixture 2 ON. On the other hand, when finding that the turn OFF operation has been performed on the operating member 31, the state decision unit 14 determines that supply of power to the light fixture 2 be suspended to turn the light fixture 2 OFF.

Depending on the state decision made by the state decision unit 14, the condition setting unit 15 appropriately sets the condition for the speech recognition unit 12 to perform the speech recognition. That is to say, the condition for the speech recognition unit 12 to perform the speech recognition is set depending on the state decision made by the state decision unit 14.

As used herein, the "condition for performing the speech recognition" refers to a condition that needs to be met to allow the speech recognition unit 12 to perform the speech recognition.

Examples of the condition for performing the speech recognition according to this embodiment may include the following four parameters:

Parameter 1: a detection threshold value for use in the speech processing to be carried out by the speech recognition unit 12;
Parameter 2: a target speech model to be recognized by the speech recognition unit 12;
Parameter 3: the user to be recognized by the speech recognition unit 12; and
Parameter 4: the direction of incidence of the verbal command to be recognized by the speech recognition unit 12.

First of all, Parameter 1 will be described.

Parameter 1 is a detection threshold value for use in the speech processing to be carried out by the speech recognition unit 12. Setting a detection threshold value for the speech processing to be carried out by the speech recognition unit 12 determines the sensitivity with which the speech recognition unit 12 detects the speech signal while performing the speech recognition processing. The detection threshold value is the minimum signal strength of the speech signal to be recognized by the speech recognition unit 12. In this embodiment, the speech signal is a voltage signal and the signal strength of the speech signal corresponds to a voltage value of the speech signal. When finding the voltage value of the speech signal equal to or greater than the detection threshold value, the speech recognition unit 12 starts carrying out the speech processing. On the other hand, when finding the voltage value of the speech signal less than the detection threshold value for a predetermined amount of time or more, the speech recognition unit 12 stops carrying out the speech processing. That is to say, the speech recognition unit 12 carries out the speech processing when the voltage value of the speech signal reaches the detection threshold value.

Also, the smaller the detection threshold value is, the higher the detection sensitivity of the speech signal becomes. In that case, the speech recognition unit 12 is able to perform speech recognition on a speech with a smaller volume (i.e., a speech signal with a smaller voltage value). On the other hand, the larger the detection threshold value is, the lower the detection sensitivity of the speech signal becomes. In that case, it would be harder for the speech recognition unit 12 to perform speech recognition on a speech with a smaller volume. This processing of changing the detection sensitivity may be performed by having a parameter about the detection threshold value changed by the condition setting unit 15.

Next, it will be described how the condition setting unit 15 may perform the processing of changing the detection threshold value (representing the detection sensitivity of the speech signal). Note that the detection threshold value is set at either a low value or a high value. The low value is smaller than the high value. The speech recognition unit 12, of which the detection threshold value is set at the low value, is able to detect the speech signal with higher detection sensitivity than the speech recognition unit 12, of which the detection threshold value is set at the high value. Thus, the former speech recognition unit 12 is able to recognize a speech with a smaller volume.

[First Exemplary Setting of Detection Threshold Value]

When the state decision unit 14 determines that the light fixture 2 be in OFF state, the condition setting unit 15 sets the detection threshold value of the speech recognition unit 12 at the low value to increase the detection sensitivity of the speech signal. That is to say, when the light fixture 2 is in OFF state, the speech recognition unit 12 is able to recognize a speech with a small volume. Thus, even if the verbal command [(Turn) ON] has a small volume, the speech recognition unit 12 is still able to recognize the verbal command. This reduces the chances of, when the user gives the verbal command [(Turn) ON] to turn the light fixture 2 ON, the light fixture 2 being kept OFF.

On the other hand, when the state decision unit 14 determines that the light fixture 2 be in ON state, the condition setting unit 15 sets the detection threshold value of the speech recognition unit 12 at the high value to decrease the detection sensitivity of the speech signal. That is to say, when the light fixture 2 is in ON state, it is harder for the speech recognition unit 12 to recognize a speech with a low volume. This reduces the chances of the speech recognition unit 12 responding erroneously to other types of speeches (normal sounds) such as a speech emitted from a TV set or a speech uttered by the user him- or herself during conversations. Consequently, this reduces the chances of the light fixture 2 turning OFF erroneously in response to a normal sound other than the verbal command, thus lowering the risk to be caused by erroneous turn OFF.

As can be seen, the lighting control system 1 is able to improve the accuracy of controlling the light fixture 2 using speech recognition by reducing speech recognition errors.

Optionally, the condition setting unit 15 may impart a hysteresis characteristic to the processing of comparing the voltage value of the speech signal with the detection threshold value by setting the detection threshold value when the voltage value of the speech signal increases and the detection threshold value when the voltage value of the speech signal decreases at two different values.

[Second Exemplary Setting of Detection Threshold Value]

When the state decision unit 14 determines that the light fixture 2 be in OFF state, the condition setting unit 15 sets the detection threshold value of the speech recognition unit 12 at the high value to decrease the detection sensitivity of the speech signal. That is to say, when the light fixture 2 is in OFF state, it is harder for the speech recognition unit 12 to recognize a speech with a low volume. Thus, the speech recognition unit 12 reduces the chances of the light fixture 2 responding to a normal sound such as a noise in the bedroom or a voice of conversation outside of the bedroom while the user is sleeping in the bedroom. This reduce the chances of the light fixture 2 turning ON erroneously responsive to a normal sound, not a verbal command, while the user is sleeping, for example.

On the other hand, when the state decision unit 14 determines that the light fixture 2 be in ON state, the condition setting unit 15 sets the detection threshold value of the speech recognition unit 12 at the low value to increase the detection sensitivity of the speech signal. That is to say, when the light fixture 2 is in ON state, the speech recognition unit 12 is able to recognize a speech with a low volume. Therefore, even when the verbal command [(Turn) OFF] has a low volume, the speech recognition unit 12 is still able to recognize the verbal command. Consequently, this reduces the chances of the light fixture 2 being kept OFF when the user gives the verbal command [(Turn) OFF] to turn the light fixture 2 OFF.

As can be seen, the lighting control system 1 is able to improve the accuracy of controlling the light fixture 2 using speech recognition by reducing speech recognition errors.

Optionally, the condition setting unit 15 may impart a hysteresis characteristic to the processing of comparing the voltage value of the speech signal with the detection threshold value by setting the detection threshold value when the voltage value of the speech signal increases and the detection threshold value when the voltage value of the speech signal decreases at two different values.

Next, Parameter 2 will be described.

Parameter 2 is a target speech model to be recognized by the speech recognition unit 12. The storage unit 16 stores, in advance, respective speech models of a plurality of verbal commands. The speech recognition unit 12 compares a speech signal with the speech models stored in the storage unit 16. When finding any of the speech models matching the speech signal, the speech recognition unit 12 is able to determine the language (such as a word, a syllable, or a sentence) represented by the speech picked up.

If there are too many speech models to be compared by the speech recognition unit 12, however, the chances of the speech recognition unit 12 making speech recognition errors could increase. Thus, the condition setting unit 15 selects one or more speech models that may be used by the speech recognition unit 12 for the speech recognition processing, out of the plurality of speech models stored in the storage unit 16, as target speech model(s). This allows the speech recognition unit 12 to recognize only the verbal command corresponding to the target speech model(s).

[Exemplary Setting of Target Speech Model]

When the state decision unit 14 determines that the light fixture 2 be in OFF state, the condition setting unit 15 sets only the verbal command [(Turn) ON] as the target speech model. That is to say, when the light fixture 2 is in OFF state, the speech recognition unit 12 is able to recognize only the verbal command [(Turn) ON]. In general, when the light fixture 2 is in OFF state, verbal commands such as [(Turn) OFF], [Turn UP], [Turn DOWN], [Incandescent], and [Neutral] are not used. Thus, the speech recognition unit 12 is able to reduce speech recognition errors by avoiding use of these speech models, corresponding to the verbal commands that are not used when the light fixture 2 is in OFF state, for the speech recognition processing.

In addition, the speech recognition unit 12 uses only the target speech model for the speech recognition processing, thus reducing the computational load of the speech recognition processing as well.

Next, Parameter 3 will be described.

Parameter 3 is the user to be recognized by the speech recognition unit 12.

In a situation where the storage unit 16 stores, in advance, verbal command speech models on a user-by-user basis, if there are too many users, the chances of the speech recognition unit 12 making speech recognition errors could increase. Thus, the condition setting unit 15 selects one or more users' speech models that may be used by the speech recognition unit 12 as the target(s) for the speech recognition processing, out of the plurality of user-by-user speech models stored in the storage unit 16, as target speech model(s). This allows the speech recognition unit 12 to recognize only the verbal command corresponding to the target speech model(s) (i.e., target user's speech model).

[Exemplary User Setting]

When the state decision unit 14 determines that the light fixture 2 be in ON state, the condition setting unit 15 sets only a father speech model or a mother speech model as the target speech model. That is to say, when the light fixture 2 is in ON state, the speech recognition unit 12 is able to recognize only the father's or mother's verbal command. In other words, when the light fixture 2 is in ON state, the speech recognition unit 12 does not recognize a child's verbal command. This reduces the chances of the light fixture 2 turning OFF erroneously in response to a child's verbal command, thus lowering the risk caused by erroneous turn OFF.

Next, Parameter 4 will be described.

Parameter 4 is the direction of incidence of a verbal command to be recognized by the speech recognition unit 12.

In that case, the microphone 11 is an array of microphones, i.e., an array in which a plurality of microphones are arranged in line. The speech recognition unit 12 is able to detect the direction of incidence of a speech based on respective outputs of the array of microphones (i.e., the direction of the user as viewed from the microphones 11). Thus, the condition setting unit 15 defines only a speech signal, of which the direction of incidence of the speech is a particular target recognition direction, as the target of speech recognition.

[Exemplary Setting of Direction of Incidence of Verbal Command]

When the state decision unit 14 determines that the light fixture 2 be in ON state, the condition setting unit 15 sets every direction but the direction in which a TV set is installed as particular recognition directions as viewed from the microphone 11. That is to say, when the light fixture 2 is in ON state, the speech recognition unit 12 is able to recognize a verbal command coming from every direction but the direction in which the TV set is installed. This allows, when the light fixture 2 is in ON state, the speech recognition unit 12 to reduce the chances of the light fixture 2 turning OFF erroneously responsive to a speech coming out of the TV set, thus lowering the risk to be caused by erroneous turn OFF.

Note that the specifics of those parameters for performing speech recognition, including the detection threshold value, the target speech model to be recognized, the user to be recognized, and the direction of incidence of the verbal command to be recognized, described above should not be construed as limiting. Optionally, the condition setting unit 15 may use these Parameters 1-4 in combination as appropriate.

Furthermore, the condition setting unit 15 suitably sets the condition for performing speech recognition based on not only the state of the light fixture 2 but also external factors other than the state decision made by the state decision unit 14.

Examples of the external factors include the current time and the presence or absence of any human in/from the lighting space illuminated by the light fixture 2.

For example, if the current time falls within daytime hours (from eight to eighteen), then the condition setting unit 15 sets only the speech model regarding the Turn OFF command as the target speech model and excludes verbal commands regarding other Turn ON, light intensity control, and light color control commands from the target speech models. That is to say, if the current time falls within daytime hours (from eight to eighteen), the speech recognition unit 12 is able to recognize only the verbal command regarding the Turn OFF command. This reduces, when the current time falls within daytime hours (from eight to eighteen), the chances of the light fixture 2 turning ON erroneously. Note that if the current time falls out of the daytime hours (from eight to eighteen), then the condition setting unit 15 may set every speech model as target speech models.

Also, if no humans are present in the lighting space to be illuminated by the light fixture 2, then the condition setting unit 15 sets only the speech model regarding the Turn OFF command as the target speech model and excludes verbal commands regarding other Turn ON, light intensity control, and light color control commands from the target speech models. That is to say, if no humans are present in the lighting space, the speech recognition unit 12 is able to recognize only the verbal command regarding the Turn OFF command. This reduces, when no humans are present in the lighting space, the chances of the light fixture 2 turning ON erroneously. Note that if any human is present in the lighting space to be illuminated by the light fixture 2, then the condition setting unit 15 may set every speech model as target speech models.

Optionally, the state decision unit 14 may determine the state of the light fixture 2 based on the illuminance of the lighting space to be illuminated by the light fixture 2. In that case, an illuminance sensor for measuring the illuminance of the lighting space is installed, and the state decision unit 14 detects the illuminance of the lighting space based on the result of measurement by the illuminance sensor. When finding the illuminance of the lighting space equal to or greater than a predetermined illuminance threshold value, the state decision unit 14 determines that the light fixture 2 be in ON state. On the other hand, when finding the illuminance of the lighting space less than the predetermined illuminance threshold value, the state decision unit 14 determines that the light fixture 2 be in OFF state. This allows the illuminance of the lighting space to be detected with both the light emitted from the light fixture 2 and external light taken into account, thus enabling lighting control to be performed with the quantity of the external light irradiating the lighting space taken into account.

Optionally, the state decision unit 14 may determine, as the state of the light fixture 2, the light intensity control level of the light fixture 2. In that case, the condition setting unit 15 sets the condition for performing speech recognition according to the light intensity control level of the light fixture 2. This allows the condition setting unit 15 to more finely set the condition for performing the speech recognition. That is to say, this allows the condition setting unit 15 to more finely change the parameters such as the detection threshold value of the speech signal for the speech recognition unit 12, the target speech model to be recognized, the user to be recognized, and the direction of incidence of the verbal command to be recognized.

Optionally, the lighting control system 1 may perform lighting control using speech recognition on a plurality of light fixtures 2. In that case, the lighting control system 1 is suitably able to perform individual control, group control, and scene control. In the case of the individual control, the lighting control system 1 performs lighting control on each of the plurality of light fixtures 2 on an individual basis. In the case of the group control, two or more light fixtures 2 are controlled toward the same state. In the case of the scene control, the plurality of light fixtures 2 are controlled simultaneously such that each of the plurality of light fixtures 2 is controlled toward a particular state.

If necessary, the lighting control system 1 may distribute the speech recognition unit 12, the lighting control unit 13, the state decision unit 14, the condition setting unit 15, and the storage unit 16 in two or more devices. Alternatively, the lighting control system 1 may also be implemented as a single device including the speech recognition unit 12, the lighting control unit 13, the state decision unit 14, the condition setting unit 15, and the storage unit 16 in a single housing.

Furthermore, each of the speech recognition unit 12, the lighting control unit 13, the state decision unit 14, the condition setting unit 15, and the storage unit 16 may be implemented as a single unit or two or more units, whichever is appropriate. Furthermore, at least some functions of the lighting control system 1 may be performed by a cloud computing system.

Figure 3:
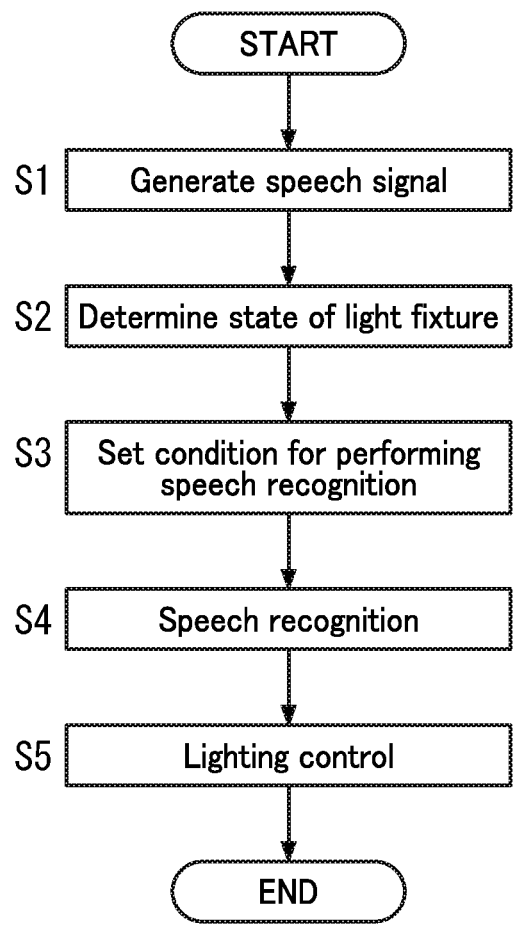
FIG. 3 is a flowchart showing a lighting control method for the lighting control system.

The lighting control system 1 performs the lighting control method as shown in the flowchart of FIG. 3.

First of all, the microphone 11 picks up a speech, and generates and outputs a speech signal (in Step S1).

The state decision unit 14 determines the state of the light fixture 2 (in Step S2).

The condition setting unit 15 sets, depending on the state decision made by the state decision unit 14, the condition for the speech recognition unit 12 to perform speech recognition (in Step S3).

The speech recognition unit 12 recognizes the verbal command by performing speech recognition on the speech signal. Then, the speech recognition unit 12 generates command data (speech recognition information) corresponding to the verbal command recognized (in Step S4).

The lighting control unit 13 controls the light fixture 2 in accordance with the command data (in Step S5).

(Variation)

Figure 4:
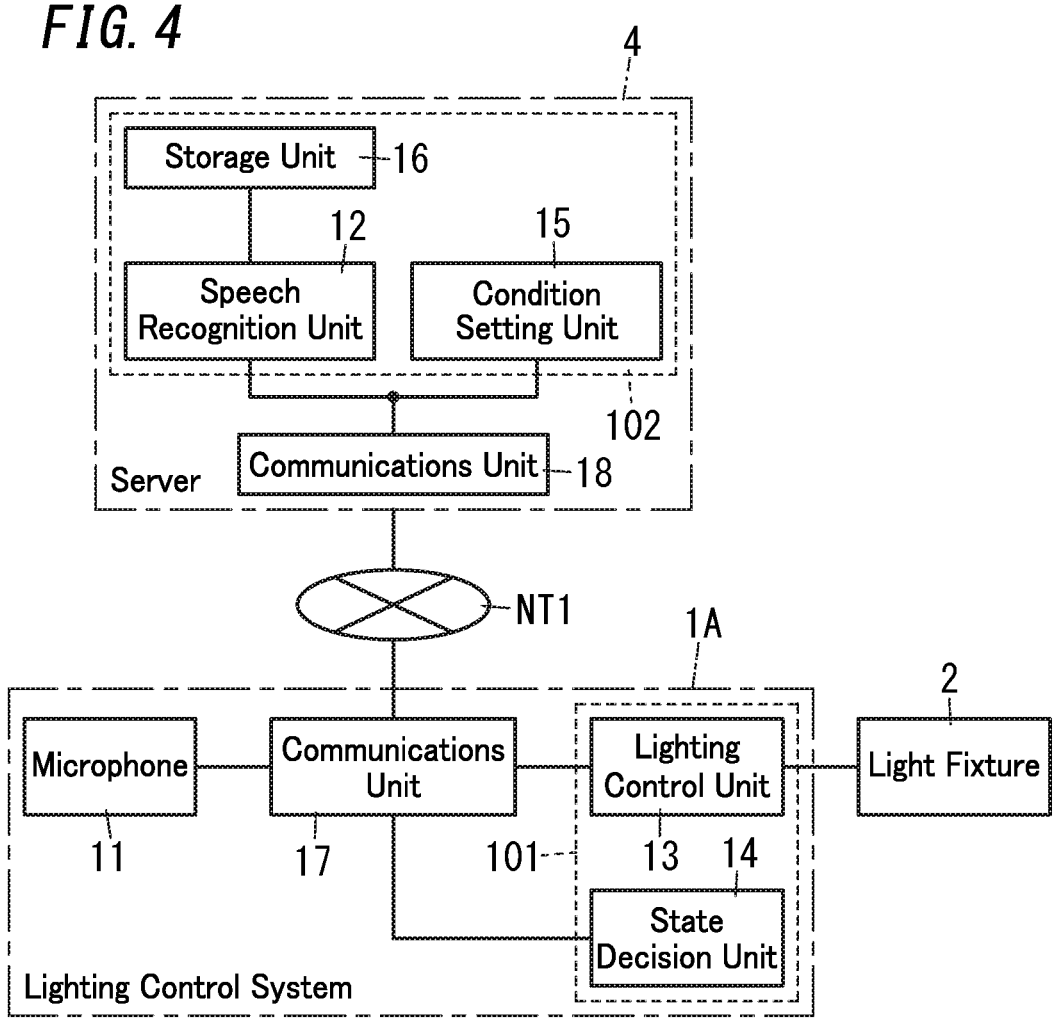
FIG. 4 is a block diagram illustrating a variation of the lighting control system.

FIG. 4 illustrates a configuration for a lighting control system 1A as a variation of the exemplary embodiment.

In this variation, the signal processing unit 10 shown in FIG. 1 is divided into a first unit 101 and a second unit 102. The first unit 101 includes the lighting control unit 13 and the state decision unit 14. The second unit 102 includes the speech recognition unit 12, the condition setting unit 15, and the storage unit 16.

The lighting control system 1A includes the microphone 11, a communications unit 17, and the first unit 101. The second unit 102 is provided for a server 4 at a remote location. The server 4 includes another communications unit 18 and the second unit 102. The communications unit 17 of the first unit 101 and the communications unit 18 of the second unit 102 are configured to communicate with each other over a communications network NT1 including at least one of a power line, a wireless LAN, the Internet, and a mobile communications network.

A speech signal representing the speech picked up by the microphone 11 and the state decision made by the state decision unit 14 are transmitted by the communications unit 17 to the communications unit 18. In the second unit 102, the condition setting unit 15 sets a condition for performing speech recognition depending on the state decision made by the state decision unit 14, and the speech recognition unit 12 carries out speech processing in accordance with the condition. When recognizing a verbal command given by the user, the speech recognition unit 12 generates command data (speech recognition information) corresponding to the verbal command recognized. The command data is transmitted by the communications unit 18 to the communications unit 17. In the first unit 101, the lighting control unit 13 controls the light fixture 2 in accordance with the command data.

In this variation, the server 4 performs the processing of setting the condition for performing speech recognition and the speech processing. In general, speech processing imposes a heavy load. Thus, making the server 4 carry out this speech processing cuts down the computational processing load on the lighting control system 1A.

Note that the microphone 11 is not an essential constituent element for the lighting control system 1A. When the lighting control system 1A does not include the microphone 11, the microphone 11 is suitably implemented as a different unit from the lighting control system 1A.

Optionally, the microphone 11 and the second unit 102 may be implemented as one or more units, which may be arranged in the same space (which may be a room, a building, or a facility) as the lighting control system 1A.

Alternatively, the condition setting unit 15 may be provided for the first unit 101. In that case, the communications unit 17 transmits a setting signal representing detailed settings by the condition setting unit 15 (i.e., the parameters of the condition for carrying out the speech processing) to the communications unit 18. Then, the speech recognition unit 12 updates, in accordance with the setting signal, the condition for carrying out the speech processing.

Optionally, the speech recognition information does not have to be the command data associated in advance with the verbal command recognized but may also be text data of the verbal command recognized, for example.

As can be seen from the foregoing description, a lighting control system 1 according to a first aspect of the exemplary embodiment of the present disclosure includes a speech recognition unit 12, a lighting control unit 13, a state decision unit 14, and a condition setting unit 15. The speech recognition unit 12 carries out speech processing. The speech processing includes: performing speech recognition on a speech signal; and generating speech recognition information (which may be either command data or text data) corresponding to a speech recognized. The lighting control unit 13 controls a light fixture 2 in accordance with the speech recognition information. The state decision unit 14 makes a state decision of the light fixture 2. The condition setting unit 15 sets, depending on the state decision made by the state decision unit 14, a condition for the speech recognition unit 12 to carry out the speech processing.

This lighting control system 1 sets a condition for performing speech recognition depending on the state of the light fixture 2 (which is at least one of an ON state, an OFF state, or a light intensity control level). This allows the lighting control system 1 to improve the accuracy of controlling the light fixture 2 using speech recognition by reducing speech recognition errors.

In a lighting control system 1 according to a second aspect of the exemplary embodiment, which may be implemented in conjunction with the first aspect, the speech recognition unit 12 compares a signal strength of the speech signal with a detection threshold value, and starts carrying out the speech processing when finding the signal strength equal to or greater than the detection threshold value. The condition setting unit 15 suitably sets the detection threshold value depending on the state decision.

This allows the lighting control system 1 to set the detection sensitivity of the speech signal depending on the state decision made by the state decision unit 14. Thus, the lighting control system 1 is able to improve the accuracy of controlling the light fixture 2 using speech recognition by reducing speech recognition errors.

In a lighting control system 1 according to a third aspect of the exemplary embodiment, which may be implemented in conjunction with the second aspect, the condition setting unit 15 suitably lowers the detection threshold value when the state decision indicates that the light fixture 2 be in ON state.

This allows the lighting control system 1 to reduce the chances of the light fixture 2 turning OFF erroneously responsive to a normal sound, not a verbal command, thus lowering the risk to be caused by erroneous turn OFF.

In a lighting control system 1 according to a fourth aspect of the exemplary embodiment, which may be implemented in conjunction with the second aspect, the condition setting unit 15 suitably lowers the detection threshold value when the state decision indicates that the light fixture 2 be in OFF state.

This allows the lighting control system 1 to reduce the chances of the light fixture 2 turning ON erroneously responsive to a normal sound, not a verbal command, while the user is sleeping, for example.

In a lighting control system 1 according to a fifth aspect of the exemplary embodiment, which may be implemented in conjunction with any one of the first to fourth aspects, the speech recognition information includes multiple pieces of speech recognition information that respectively correspond to a plurality of speech models. When the speech recognized by the speech recognition unit 12 matches one or more target speech models, out of the plurality of speech models, the speech recognition unit 12 generates the speech recognition information. Then, the condition setting unit 15 suitably sets the target speech model depending on the state decision.

This allows the lighting control system 1 to improve the accuracy of controlling the light fixture 2 using speech recognition by reducing speech recognition errors. In addition, this also allows the lighting control system 1 to reduce the computational load of the speech processing on the speech recognition unit 12 by avoiding use of unnecessary speech models, other than the target speech model, for the speech processing.

In a lighting control system 1 according to a sixth aspect of the exemplary embodiment, which may be implemented in conjunction with any one of the first to fifth aspects, the state decision unit 14 suitably makes the state decision of the light fixture 2 depending on how power is supplied to the light fixture 2.

This allows the lighting control system 1 to make a state decision of the light fixture 2 easily.

In a lighting control system 1 according to a seventh aspect of the exemplary embodiment, which may be implemented in conjunction with any one of the first to fifth aspects, the state decision unit 14 suitably makes the state decision of the light fixture 2 based on an illuminance of a lighting space being illuminated by the light fixture 2.

This allows the lighting control system 1 to make a state decision of the light fixture 2 easily, and also allows the lighting control system 1 to detect the illuminance of the lighting space with both the light emitted from the light fixture 2 and external light taken into account. Thus, the lighting control system 1 is able to perform lighting control with the quantity of external light, irradiating the lighting space, taken into account.

In a lighting control system 1 according to an eighth aspect of the exemplary embodiment, which may be implemented in conjunction with any one of the first to seventh aspects, the state decision unit 14 suitably determines, as a state of the light fixture 2, a light intensity control level of the light fixture 2.

This allows the lighting control system 1 to more finely set the condition for carrying out the speech processing.

In a lighting control system 1 according to a ninth aspect of the exemplary embodiment, which may be implemented in conjunction with any one of the first to eighth aspects, the condition setting unit 15 suitably sets, based on an external factor other than the state decision made by the state decision unit 14, the condition for performing the speech recognition.

This allows the lighting control system 1 to change the condition for performing the speech recognition based on an external factor, thus further reducing the chances of the light fixture 2 being controlled erroneously.

A lighting control system 1A according to a tenth aspect of the exemplary embodiment of the present disclosure is designed to receive speech recognition information (which may be either command data or text data) corresponding to a speech recognized by a speech recognition unit 12. The speech recognition unit 12 performs speech recognition on a speech signal. The lighting control system 1A includes a lighting control unit 13, a state decision unit 14, and a communications unit 17. The lighting control unit 13 controls a light fixture 2 in accordance with the speech recognition information. The state decision unit 14 makes a state decision of the light fixture 2. The communications unit 17 outputs the speech signal and the state decision made by the state decision unit 14 to the speech recognition unit 12 and receives the speech recognition information from the speech recognition unit 12.

This lighting control system 1A is able to improve the accuracy of controlling the light fixture 2 using speech recognition by reducing speech recognition errors. In addition, this also reduces the computational load on the lighting control system 1A by having the server 4 carry out the speech processing.

A lighting control method according to an eleventh aspect of the exemplary embodiment of the present disclosure includes:

a speech recognition step of carrying out speech processing, the speech processing including: recognizing a speech by performing speech recognition on a speech signal; and generating speech recognition information (which may be either command data or text data) corresponding to the speech recognized (Step 4);

a lighting control step of controlling a light fixture 2 in accordance with the speech recognition information (Step 5);

a state decision step of making a state decision of the light fixture 2 (Step 2); and a condition setting step of setting, depending on the state decision made in the state decision step, a condition for carrying out the speech processing in the speech recognition step (Step S3).

This lighting control method is able to improve the accuracy of controlling the light fixture 2 using speech recognition by reducing speech recognition errors.

A program according to a twelfth aspect of the exemplary embodiment of the present disclosure is designed to make a computer system execute the lighting control method of the eleventh aspect.

This program is able to improve the accuracy of controlling the light fixture 2 using speech recognition by reducing speech recognition errors.

A computer program according to a thirteenth aspect of the exemplary embodiment of the present disclosure includes a group of commands. When the program is executed by a computer, the group of commands makes the computer execute the lighting control method of the eleventh aspect.

This computer program is able to improve the accuracy of controlling the light fixture 2 using speech recognition by reducing speech recognition errors.

A lighting control system according to another aspect of the exemplary embodiment of the present disclosure is designed to receive speech recognition information (which may be either command data or text data) corresponding to a speech recognized by a speech recognition unit 12 that performs speech recognition on a speech signal. The lighting control system includes a lighting control unit 13, a state decision unit 14, a condition setting unit 15, and a communications unit 17. The lighting control unit 13 controls a light fixture 2 in accordance with the speech recognition information. The state decision unit 14 makes a state decision of the light fixture 2. The condition setting unit 15 sets, depending on the state decision made by the state decision unit 14, a condition for the speech recognition unit 12 to carry out the speech processing. The communications unit 17 outputs the state decision made by the state decision unit 14 to the speech recognition unit 12 and receives the speech recognition information from the speech recognition unit 12.

Note that the exemplary embodiment described above is only an example of the present invention and should not be construed as limiting. Rather, the exemplary embodiment may be readily modified in various manners depending on a design choice or any other factor without departing from a true spirit and scope of the present disclosure.

REFERENCE SIGNS LIST

1, 1A Lighting Control System
11 Microphone
12 Speech Recognition Unit 13 Lighting Control Unit
14 State Decision Unit
15 Condition Setting Unit
16 Storage Unit
17 Communications Unit
18 Communications Unit
2 Light Fixture
3 Lighting Switch
4 Server

The invention claimed is:

1. A lighting control system comprising:
a speech recognition unit configured to carry out speech processing, the speech processing including: performing speech recognition on a speech signal; and generating speech recognition information corresponding to a speech recognized;
a lighting control unit configured to control a light fixture in accordance with the speech recognition information;
a state decision unit configured to make a state decision of the light fixture which is at least one of an ON state, an OFF state, a light intensity control level, or a color tone; and
a condition setting unit configured to set, depending on the state decision made by the state decision unit, a condition for the speech recognition unit to carry out the speech processing.

2. The lighting control system of claim 1, wherein
the speech recognition unit is configured to compare a signal strength of the speech signal with a detection threshold value, and start carrying out the speech processing when finding the signal strength equal to or greater than the detection threshold value, and
the condition setting unit is configured to set the detection threshold value depending on the state decision.

3. The lighting control system of claim 2, wherein
the condition setting unit is configured to, when the state decision indicates that the light fixture be in ON state, lower the detection threshold value.

4. The lighting control system of claim 2, wherein
the condition setting unit is configured to, when the state decision indicates that the light fixture be in OFF state, lower the detection threshold value.

5. The lighting control system of claim 1, wherein
the speech recognition information includes multiple pieces of speech recognition information that respectively correspond to a plurality of speech models,
when the speech recognized by the speech recognition unit matches one or more target speech models, out of the plurality of speech models, the speech recognition unit is configured to generate the speech recognition information, and the condition setting unit is configured to set the target speech model depending on the state decision.

6. The lighting control system of claim 1, wherein
the state decision unit is configured to make the state decision of the light fixture depending on how power is supplied to the light fixture.

7. The lighting control system of claim 1, wherein
the state decision unit is configured to make the state decision of the light fixture based on an illuminance of a lighting space being illuminated by the light fixture.

8. The lighting control system of claim 1, wherein
the state decision unit is configured to determine, as a state of the light fixture, a light intensity control level of the light fixture.

9. The lighting control system of claim 1, wherein
the condition setting unit is configured to set, based on an external factor other than the state decision made by the state decision unit, the condition for performing the speech recognition.

10. A lighting control system designed to receive speech recognition information corresponding to a speech recognized by a speech recognition unit, the speech recognition unit being configured to carry out speech processing, the speech processing including: performing speech recognition on a speech signal; and generating the speech recognition information, the lighting control system comprising:
a lighting control unit configured to control a light fixture in accordance with the speech recognition information;
a state decision unit configured to make a state decision of the light fixture which is at least one of an ON state, an OFF state, a light intensity control level, or a color tone;
a condition setting unit configured to set, depending on the state decision made by the state decision unit, a condition for the speech recognition unit to carry out the speech processing; and
a communications unit configured to output the speech signal and the state decision made by the state decision unit to the speech recognition unit and receive the speech recognition information from the speech recognition unit.

11. A lighting control method comprising:
a speech recognition step of carrying out speech processing, the speech processing including: recognizing a speech by performing speech recognition on a speech signal; and generating speech recognition information corresponding to the speech recognized;
a lighting control step of controlling a light fixture in accordance with the speech recognition information;
a state decision step of making a state decision of the light fixture which is at least one of an ON state, an OFF state, a light intensity control level, or a color tone; and
a condition setting step of setting, depending on the state decision made in the state decision step, a condition for carrying out the speech processing in the speech recognition step.

12. A non-transitory computer readable medium having stored thereon a program designed to make a computer system execute the lighting control method of claim 11.

13. The lighting control system of claim 2, wherein
the speech recognition information includes multiple pieces of speech recognition information that respectively correspond to a plurality of speech models,
when the speech recognized by the speech recognition unit matches one or more target speech models, out of the plurality of speech models, the speech recognition unit is configured to generate the speech recognition information, and the condition setting unit is configured to set the target speech model depending on the state decision.

14. The lighting control system of claim 2, wherein
the state decision unit is configured to make the state decision of the light fixture depending on how power is supplied to the light fixture.

15. The lighting control system of claim 2, wherein
the state decision unit is configured to make the state decision of the light fixture based on an illuminance of a lighting space being illuminated by the light fixture.

16. The lighting control system of claim 2, wherein
the state decision unit is configured to determine, as a state of the light fixture, a light intensity control level of the light fixture.

17. The lighting control system of claim 2, wherein the condition setting unit is configured to set, based on an external factor other than the state decision made by the state decision unit, the condition for performing the speech recognition.

\* \* \* \* \*